Patented Dec. 30, 1930

1,787,036

UNITED STATES PATENT OFFICE

JACOB EHRLICH, OF BELLEVILLE, NEW JERSEY, ASSIGNOR TO VERONA CHEMICAL CO., OF NEWARK, NEW JERSEY, A CORPORATION OF NEW JERSEY

PROCESS FOR THE PRODUCTION OF PROPENYL DERIVATIVES OF AROMATIC HYDROCARBONS

No Drawing. Application filed October 12, 1928. Serial No. 312,213.

My invention relates to the conversion, or isomerization of allyl derivatives of aromatic hydrocarbons into the corresponding propenyl derivatives.

It has been suggested that this isomerization be accomplished by heating the allyl derivative of an aromatic hydrocarbon with an alkali, such as potassium hydroxide, or sodium hydroxide, in the presence of aniline.

I have found that if the isomerization be conducted in the presence of an allyl isomerizing chemical compound of the organic hydroxy type in which the allyl derivative of the aromatic compound and the produced propenyl derivative are soluble during the steps of procedure, the reactions take place much more uniformly and rapidly and at lower temperatures; are more easily controlled, thus avoiding the production of resinous matters; are more economical, and that a considerable increase in yield of the propenyl derivative results.

I have found that organic hydroxy compounds, which are not substantially chemically affected during the process and in which the allyl derivative and the produced propenyl derivative are soluble during the process are particularly suitable for this purpose, with and without the presence of aniline or similar aromatic amines.

I have found that in the employment of such suitable hydroxy compounds, the mixture remains liquid, mobile and homogeneous, thus permitting it to be easily stirred, resulting in a perfect contact between the reaction chemicals and an increased yield.

I have further found that the use of these hydroxy compounds allows of a lower temperature and greater speed of isomerization thus giving more perfect control of the reaction, reducing the amount of produced resinous substances, and increasing the yield of the desired product.

The above-mentioned, and other, valuable attributes of the process of my invention will be evident upon a consideration of my specification.

As one example of the following of my process, I give the following:—

100 grams clove oil, containing 90% by weight eugenol, and 67 grams phenol are dissolved, with constant stirring, in 438 grams aqueous potassium hydroxide containing 150 grams potassium hydroxide. This solution is heated in a still while stirring, to 170° C. Isomerization does not take place rapidly until the temperature has reached about 150° C. When the temperature has reached 170° C., the solution is cooled to 150° C. The raising of the temperature from 150° C. to 170° C. and its lowering to 150° C. should be uniform and occupy about 20 to 25 minutes. At the boiling temperatures, about 113° C. to 170° C., the water and practically all of the original terpenes will be distilled off. The total period elapsed is from one and one-half to two hours. The potassium salt of iso-eugenol, thus formed may be recovered as such, or may be converted into iso-eugenol and recovered as desired, by any suitable method.

The process of my invention may be followed also with the use of dilute alkali under pressure.

While the above example refers to the isomerization of eugenol to iso-eugenol I do not limit myself to this particular allyl derivative of an aromatic hydrocarbon, as my process is applicable not only to eugenol but other allyl compounds, as for instance the conversion of the methyl ether of eugenol to the methyl ether of iso-eugenol, of chavibetol to iso-chavibetol, of 1-allyl-3-ethoxy-4-hydroxy benzene to 1-propenyl-3-ethoxy-4-hydroxy benzene, and 1-allyl-3-4-dihydroxy benzene to 1-propenyl-3-4-dihydroxy benzene. My process, therefore, includes the use of eugenol, its homologues and analogues and their derivatives.

By "allyl-isomerizing hydroxy compounds," I mean those organic phenolic compounds which cause a solution of the allyl compound and its corresponding propenyl derivative during the isomerization process and in which process said phenolic compounds remain practically chemically unchanged, among which I mention phenol, its homologues, analogues and their derivatives including ortho-cresol, B-napthol and 2- chlorphenol, not limiting myself however to those particularly mentioned.

Neither do I limit myself to the use of a single allyl compound nor to the use of a single allyl-isomerizing organic hydroxy compound in my process, as a plurality of either or both, of these compounds may be employed, and by "allyl derivative of an aromatic hydrocarbon" and by "allyl isomerizing hydroxy compound" in my claims I mean either one or a plurality thereof.

I do not limit myself to the chemical compounds, times, temperatures, quantities or steps of procedure particularly mentioned and described as these are given simply as a means for describing the process of my invention.

What I claim is:—

1. In a process for the production of propenyl derivatives of aromatic hydrocarbons from their corresponding allyl derivatives, the step which comprises heating an allyl derivative of an aromatic hydrocarbon with an alkali in the presence of an organic phenolic compound which causes a solution of the allyl compound and its corresponding propenyl derivative during the isomerization process and in which process said phenolic compound remains practically chemically unchanged.

2. In a process for the production of propenyl derivatives of aromatic hydrocarbons from their corresponding allyl derivatives, the step which comprises heating an allyl derivative of an aromatic hydrocarbon with potassium hydroxide in the presence of an organic phenolic compound which causes a solution of the allyl compound and its corresponding propenyl derivative during the isomerization process and in which process said phenolic compound remains practically chemically unchanged.

3. In a process for the production of propenyl derivatives of aromatic hydrocarbons from their corresponding allyl derivatives, the step which comprises heating an allyl derivative of an aromatic hydrocarbon with an alkali in the presence of phenol.

4. In a process for the production of propenyl derivatives of aromatic hydrocarbons from their corresponding allyl derivatives, the step which comprises heating an allyl derivative of an aromatic hydrocarbon with potassium hydroxide in the presence of phenol.

5. In a process for the production of iso-eugenol, the step which comprises heating eugenol with an alkali in the presence of an organic phenolic compound which causes a solution of the allyl compound and its corresponding propenyl derivative during the isomerization process and in which process said phenolic compound remains practically chemically unchanged.

6. In a process for the production of iso-eugenol, the step which comprises heating eugenol with potassium hydroxide in the presence of an organic phenolic compound which causes a solution of the allyl compound and its corresponding propenyl derivative during the isomerization process and in which process said phenolic compound remains practically chemically unchanged.

7. In a process for the production of iso-eugenol, the step which comprises heating eugenol with an alkali in the presence of phenol.

8. In a process for the production of iso-eugenol, the step which comprises heating eugenol with potassium hydroxide in the presence of phenol.

Signed at Belleville in the county of Essex and State of New Jersey this 8th day of October, 1928.

JACOB EHRLICH.